May 31, 1932.  J. H. FLINK  1,860,409
SHEARS
Filed May 25, 1929  2 Sheets-Sheet 1
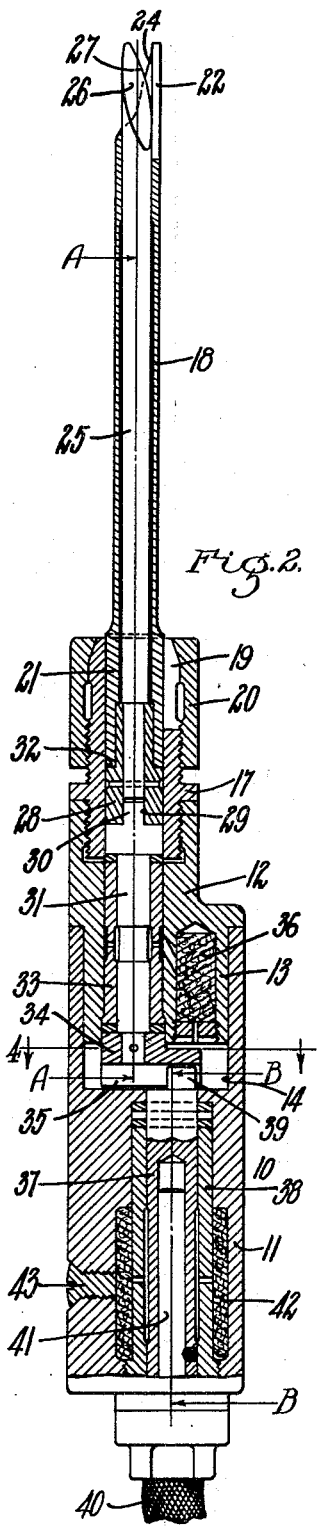
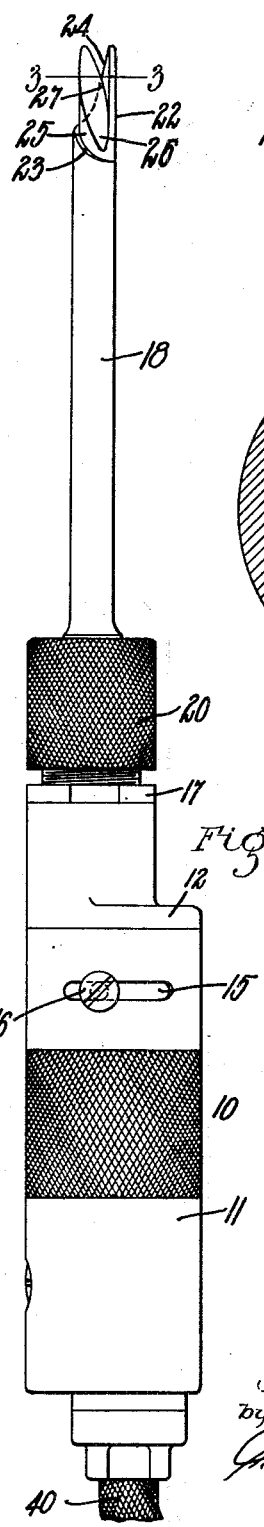
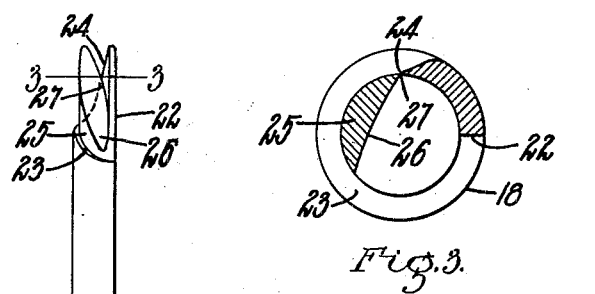
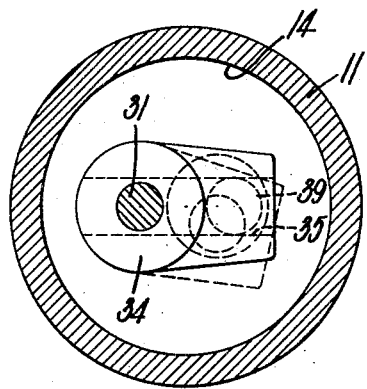
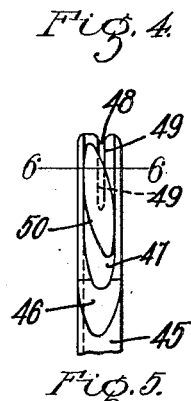
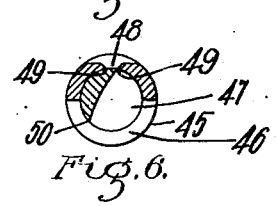
Inventor:
John H. Flink,
by Charles J. Gooding,
Atty.

Patented May 31, 1932

1,860,409

UNITED STATES PATENT OFFICE

JOHN H. FLINK, OF WATERTOWN, MASSACHUSETTS, ASSIGNOR, BY MESNE ASSIGNMENTS, TO HOOD RUBBER COMPANY, INC., OF WILMINGTON, DELAWARE, A CORPORATION OF DELAWARE

SHEARS

Application filed May 25, 1929. Serial No. 365,933.

This invention relates to a shears and has for its object to provide a power driven high speed type of device which cuts with a shearing action; the device being constructed and arranged to be inserted in narrow, or otherwise inaccessible locations where it is either impossible or difficult to cut with the usual forms of scissors or shears.

Another object of the invention is to provide a device which may be employed for the purpose of cutting upon irregular lines in a rapid and efficient manner.

Another object of the invention is to provide a means for varying the length of the cut that it is possible to make with one cycle of the driving member for the rotatable cutter.

The invention consists of shears as set forth in the following specification and particularly as pointed out in the claims thereof.

The device operates as a pair of shears or scissors by a snipping action rapidly repeated and while it may be used to cut sheet material of any kind, its ability to operate in close positions enables it to be used for trimming the inside of molded articles of rubber and fabric or any other material which requires cutting or trimming in close quarters. In use it is advanced endwise along the line to be cut or along and against the article to be trimmed. Due to the fact that all working parts are concealed except at the cutting point, the device may be handled with safety.

Referring to the drawings:

Figure 1 is a side elevation of a shears embodying my invention.

Fig. 2 is a central longitudinal section of the shears.

Fig. 3 is an enlarged transverse section through the cutting members as taken on the line 3—3 of Fig. 1.

Fig. 4 is an enlarged transverse section taken on the line 4—4 of Fig. 2.

Fig. 5 is a detail side elevation illustrating the end portions of a pair of cutting members which may be employed as a substitute for the knives illustrated in Figs. 1 and 2.

Fig. 6 is an enlarged transverse section through the knives of Fig. 5, taken on the line 6—6 of said figure.

Like numerals refer to like parts throughout the several views of the drawings.

Figure 7:
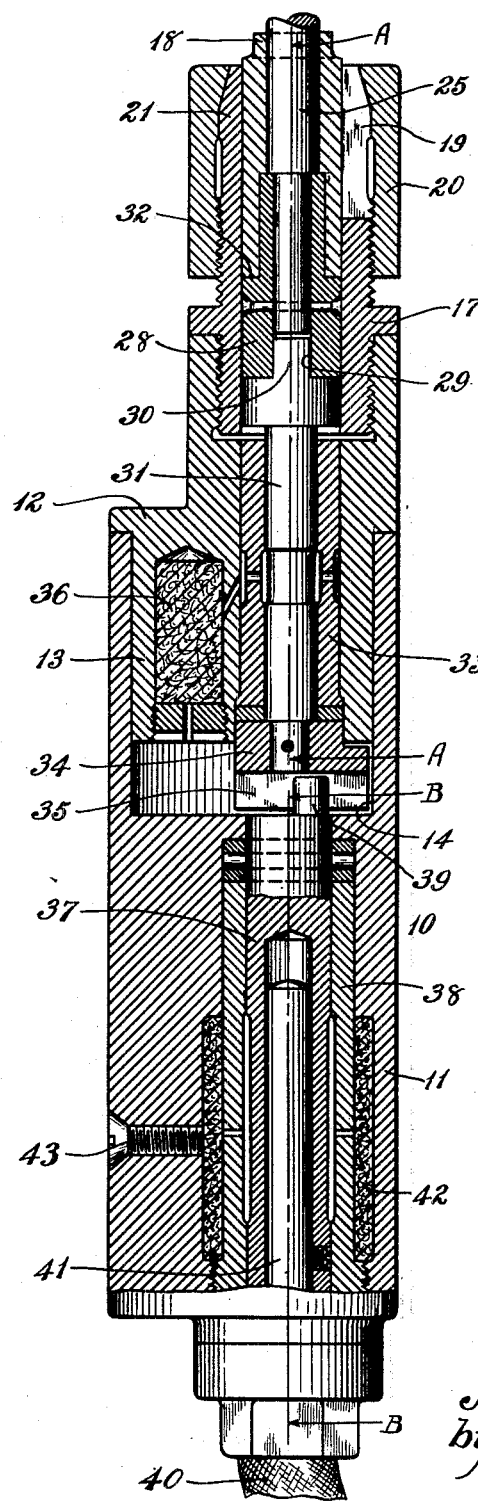
Fig. 7 is a view similar to Fig. 2 to an enlarged scale showing the device as adjusted for continuous rotary movement, part of the cutting members and flexible shaft being broken away.

In the drawings, 10 represents a handle consisting of members 11 and 12, the latter being provided with a shouldered portion 13 which is adapted to fit a recess 14 provided at one end of the handle member 11 which is rotatable upon said shouldered portion. The handle member 11 has a slot 15 formed therein and a screw 16 passes through said slot and has screw-threaded engagement with the shouldered portion 13 of the handle member 12, thereby providing a means for adjustably securing said handle members together and allowing a limited rotatable movement therebetween for purposes hereinafter to be more fully described.

Detachably mounted at the outer end of the handle member 12 is a holder 17 for a stationary cutting member 18. The holder 17 has screw-threaded engagement with the handle member 12 and is slotted at 19 in order that a clamp nut 20 which, in turn, has screw-threaded engagement with the holder 17 may clamp the slotted portion of said holder tightly against the periphery of the shank portion 21 of the stationary cutting member 18. The stationary cutting member 18 is tubular in form and is cut away upon its outer end at 22 upon a line extending longitudinally of the cutting member. Another cut away portion 23 intersects the inner extremity of the cut away portion 22 and extends from said intersection in a helical path a portion of the distance around the periphery of the cutting member 18 and merges with a cutting edge 24 which likewise extends in a helical curve to the outer extremity of the cutting member 18 where it intersects the cut away portion 22.

Rotatably mounted within the stationary cutting member 18 is a rotary cutting member 25 consisting of a solid rod which is bevelled at 26 toward its outer extremity and is provided with a cutting edge 27 which is adapted to co-operate with the cutting edge 24 of the stationary cutting member 18. The cutting edge 27 is helical in form and of approximately the same pitch as the pitch of the helical cutting edge 24 which is formed upon the inner surface of the tubular cutting member 18.

The cutting member 25 has a connecting member 28 rigidly secured thereto at its inner end and said connecting member has a groove 29 extending across its extremity which is adapted to fit a tongue 30 provided upon the extremity of an intermediate driving member 31. A shoulder 32 formed upon the connecting member 28 abuts against the inner extremity of the stationary cutting member 18 and positions the rotary cutting member within the stationary cutting member.

In removing the rotary cutting member 25 from the holder 17, it is necessary to also remove the stationary cutting member 18, after which the rotary cutting member may be withdrawn from the inner end of the stationary cutting member.

The intermediate driving member 31 is rotatably mounted within a bushing 33 which is located within the handle member 12, and rigidly fastened to the opposite extremity of the intermediate driving member 31 from that upon which the tongue 30 is located, is a rocker arm 34 which has a groove 35 provided in its obverse face. The intermediate driving member 31 is lubricated from an oil chamber 36 which is provided upon the interior of the handle member 12, said chamber being connected by suitable oil channels with the bearing surface of the driving member.

The intermediate driving member 31 is mounted to rock within the handle member 12 upon an axis A—A and this rocking movement is imparted thereto by a driving shaft 37 which is mounted within the handle member 11 upon an axis B—B which is eccentrically disposed with relation to the axis A—A. The shaft 37 is mounted within a bushing 38 and at its inner end has a cylindrical portion 39 formed integral therewith which is eccentrically disposed with relation to the axis B—B of said shaft. The eccentric portion 39 of the shaft 37 projects into the groove 35 of the rocker arm 34, and the periphery of said eccentric portion 39 engages the opposite sides of the groove 35.

The shaft 37 is rotated by means of a flexible shaft 40 which is connected in any suitable manner to a connecting member 41, and the latter, in turn, is rigidly secured in any suitable manner to the driving shaft 37. An oil chamber 42 is provided for the driving shaft 37 within the handle member 11 and access is had to the oil chamber through an opening which is normally closed by means of a screw 43. The flexible shaft 40 is preferably driven by an electric motor, but may be operatively connected to and driven by any suitable form of driving means.

The general operation of the device hereinbefore specifically described is as follows:— The operator grasps the device by the handle portion 10 and directs the passage of the device through the material that is being severed. During this time the driving shaft 37 is driven at a rapid rate of speed, preferably provided by an electric motor, and the rotating movement of said shaft upon the end of which is the eccentric portion 39 imparts a rapid rocking movement to the rocker arm 34 which is fastened to the shaft 31 through which the rocking movement is transmitted to the cutting member 25.

If it is desired to vary the length of the cut which may be performed by the cutting edges 24 and 27, the screw 16 is loosened and the handle members 11 and 12 are rotated one upon the other to move the axis B—B of the driving shaft 37 either toward or away from the axis A—A of the intermediate driving member 31, after which the screw 16 is again tightened to hold the handle members together. As the axis B—B is eccentric with respect to the axis A—A, it follows that when the handle members 11 and 12 are rotated one upon the other, the axis of the driving shaft 41 will be moved either toward or away from the axis of the shaft 31, with the result that when the driving shaft 37 is rotated, the eccentric portion 39 forming a part thereof, will cause the rocker arm 34 to rock a greater or a lesser amount. When the axes A—A and B—B are farthest apart the amplitude of rocking motion will be less and as the axes approach the amplitude will increase. When the axes are so adjusted to be coincident a rotary movement will be imparted to the intermediate driving member 31 and the cutting member 25.

In Figs. 5 and 6 I have illustrated a modified embodiment of my invention, in which 45 represents a stationary tubular cutting member, the end of which is cut away at 46 to expose the end portion of a rotary cutting member 47 which is the same in all respects as the cutting member 25 previously described. The cutting member 45 is furthermore slotted at 48 to form a guide for the material which is to be cut and both of the edges, furthermore, of the cutting member 45 are sharpened at said slot to form cutting edges 49 which extend longitudinally of the axes of both of the cutting members.

As the entire edge 50 of the rotary cutter 47 comprises the cutting edge, it is evident that the cutter 47 may be arranged to rock in either direction to co-operate with either side of the slot 48, and as the tool is guided through sheet material, the latter will be positioned within the slot 48 and will be severed with a shearing cut.

The word "tubular" as used in the foregoing specification and in some of the claims is intended to define a member with a bore cylindrical or arcuate in cross section irrespective of the exterior of the contour in cross section of the member which contains said bore.

The word "rotary" as used in the foregoing specification and in the claims is intended to convey either a complete rotation or a partial rotation or rocking movement.

I claim:

1. A device of the character described having, in combination, a tubular cutting member, another cutting member mounted within said tubular cutting member, said cutting members having co-operating cutting edges, and means for effecting a rotative movement of one of the cutting members.

2. A device of the character described having, in combination, a tubular cutting member, another cutting member mounted within said tubular cutting member, said cutting members having co-operating cutting edges, and means to impart a rocking movement to one of the cutting edges.

3. A device of the character described having, in combination, a tubular cutting member, another cutting member mounted within said tubular cutting member, said cutting members having co-operating cutting edges, and means for effecting a rotative movement of the last-named cutting member.

4. A device of the character described having, in combination, a stationary cutting member provided with a cutting edge, another cutting member rotatably mounted within said stationary member and co-axial therewith and having a helical cutting edge adapted to co-operate with said first-named cutting edge, and means to impart a rocking movement to said last-named cutting member.

5. A device of the character described having, in combination, a tubular cutting member provided with a helical cutting edge, another cutting member mounted within said tubular member and provided with a helical cutting edge adapted to co-operate with the cutting edge of said first-named cutting member, and means for effecting a rotative movement of one of the cutting members.

6. A device of the character described having, in combination, a cutting member provided with a helical cutting edge, another cutting member mounted within said first-named cutting member and provided with a helical cutting edge adapted to co-operate with the cutting edge of said first-named cutting member, and means for effecting a relative movement of said last-named cutting member.

7. A device of the character described having, in combination, a tubular cutting member, another cutting member mounted within said tubular cutting member, said cutting members having co-operating cutting edges, means to impart a rocking movement to one of the cutting members, and means to vary the angle through which the movable cutting member is moved.

8. A device of the character described having, in combination, a handle, a stationary cutting member rigidly secured to said handle and provided with a cutting edge, another cutting member mounted within said first-named cutting member and co-axial therewith and having a helical cutting edge adapted to co-operate with said first-named cutting edge, and means to impart a rocking movement to said last-named cutting member.

9. A device of the character described having, in combination, a handle, a stationary cutting member rigidly secured to said handle and provided with a cutting edge, another cutting member mounted within said first-named cutting member and co-axial therewith and having a helical cutting edge adapted to co-operate with said first-named cutting edge, means to impart a rocking movement to said last-named cutting member, and means to vary the angle through which the movable cutting member is rocked.

10. A device of the character described having, in combination, a handle, a stationary cutting member rigidly secured to said handle and provided with a slot through which the material is guided and having a cutting edge at the side of said slot, another cutting member mounted within said first-named cutting member and co-axial therewith and having a helical cutting edge adapted to co-operate with said first-named cutting edge, and means to impart a rocking movement to said last-named cutting member.

11. A device of the character described having, in combination, a handle, a stationary cutting member rigidly secured to said handle and provided with a cutting edge, another cutting member mounted within said first-named cutting member and co-axial therewith and having a helical cutting edge adapted to co-operate with said first-named cutting edge, an intermediate driving member interlocking with said last-named cutting member, and means to impart a rocking movement to said intermediate driving member.

12. A device of the character described having, in combination, a handle, a stationary cutting member rigidly secured to said handle and provided with a cutting edge, another cutting member mounted within said first-named cutting member and co-axial therewith and having a helical cutting edge adapted to co-operate with said first-named cutting edge, an intermediate driving member interlocking with said last-named cutting member, a rotary driving member, and means whereby the rotary driving member imparts a rocking movement to the intermediate driving member.

13. A device of the character described having, in combination, a handle, a stationary cutting member rigidly secured to said handle and provided with a cutting edge, another cutting member mounted within said first-named cutting member and co-axial therewith and having a helical cutting edge adapted to co-operate with said first-named cutting edge, and intermediate driving member interlocking with said last-named cutting member, a rotary driving member, means whereby the rotary driving member imparts a rocking movement to the intermediate driving member, and means to vary the angle through which the movable cutting member is rocked.

14. A device of the character described having, in combination, a handle, a stationary cutting member rigidly secured to said handle and provided with a cutting edge, another cutting member mounted within said first-named cutting member and co-axial therewith and having a helical cutting edge adapted to co-operate with said first-named cutting edge, an intermediate driving member interlocking with said last-named cutting member, a rocker arm fast to said intermediate driving member, a rotary driving member, and means upon said rotary driving member to engage said rocker arm and impart a rocking movement thereto.

15. A device of the character described having, in combination, a handle, a stationary cutting member rigidly secured to said handle and provided with a cutting edge, another cutting member mounted within said first-named cutting member and co-axial therewith and having a helical cutting edge adapted to co-operate with said first-named cutting edge, an intermediate driving member interlocking with said last-named cutting member, a rocker arm fast to said intermediate driving member, a driving member rotatably mounted in said handle and positioned eccentric to the axis of said intermediate driving member, and means upon said rotary driving member to engage said rocker arm and transmit a rocking movement thereto.

16. A device of the character described having, in combination, a handle, a stationary cutting member rigidly secured to said handle and provided with a cutting edge, another cutting member mounted within said first-named cutting member and co-axial therewith and having a helical cutting edge adapted to co-operate with said first-named cutting edge, an intermediate driving member interlocking with said last-named cutting member, a rocker arm fast to said intermediate driving member and provided with a groove therein, a driving member rotatably mounted in said handle eccentric to the axis of said intermediate driving member, and means upon said rotary driving member positioned eccentric to the axis of the latter and projecting into the groove of said rocker arm whereby a rocking movement is transmitted to the intermediate driving member.

17. A device of the character described having, in combination, a handle in two parts, a stationary cutting member rigidly secured to said handle and provided with a cutting edge, another cutting member mounted within said first-named cutting member and co-axial therewith and having a helical cutting edge adapted to co-operate with said first-named cutting edge, an intermediate driving member interlocking with said last-named cutting member, a rocker arm fast to said intermediate driving member and provided with a groove therein, a driving member rotatably mounted in said handle eccentric to the axis of said intermediate driving member, means upon said rotary driving member positioned eccentric to the axis of the latter and projecting into the groove of said rocker arm whereby a rocking movement is transmitted to the intermediate driving member, and means permitting said handle parts to be rotated one upon another to vary the angle through which the movable cutting member is rocked.

18. A device of the character described having, in combination, a handle in two parts, a stationary cutting member provided with a slot therein through which the material is guided and having a cutting edge at the side of said slot, means to clamp said cutting member to said handle, another cutting member mounted within said first-named cutting member and co-axial therewith and having a helical cutting edge adapted to co-operate with said first-named cutting edge, an intermediate driving member interlocking with said last-named cutting member, a rocker arm fast to said intermediate driving member, a rotary driving member, means upon said rotary driving member to engage said rocker arm and transmit a rocking movement thereto, and means permitting said handle parts to be rotated one upon another to vary the angle through which the movable cutting member is rocked.

19. A cutting device comprising a tubular blade having a concave cylindrical bearing surface extending therethrough formed with a shear edge at one end, a second blade located therein having a cooperating convex bearing surface and a cooperating shear edge, and means remote from said shear edges for effecting an arcuate shearing motion of said edges about the common axis of said bearing surfaces.

In testimony whereof I have hereunto set my hand.

JOHN H. FLINK.